Figure 4:
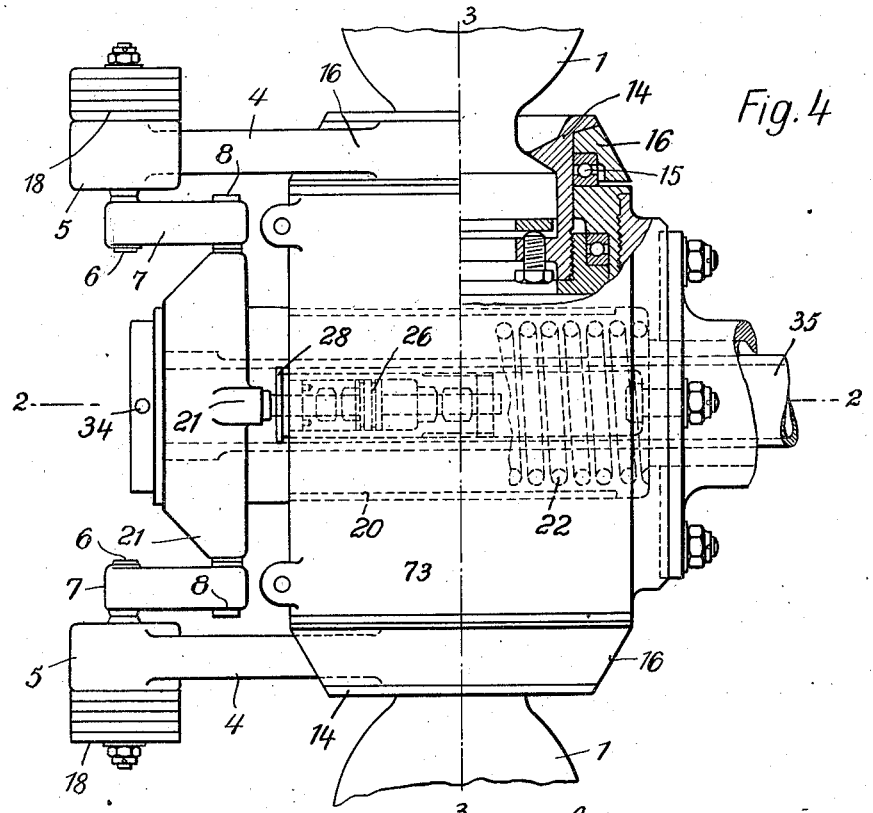

Nov. 26, 1935.  L. HOFFMANN ET AL  2,021,999
AIR PROPELLER
Filed June 23, 1934  4 Sheets-Sheet 1
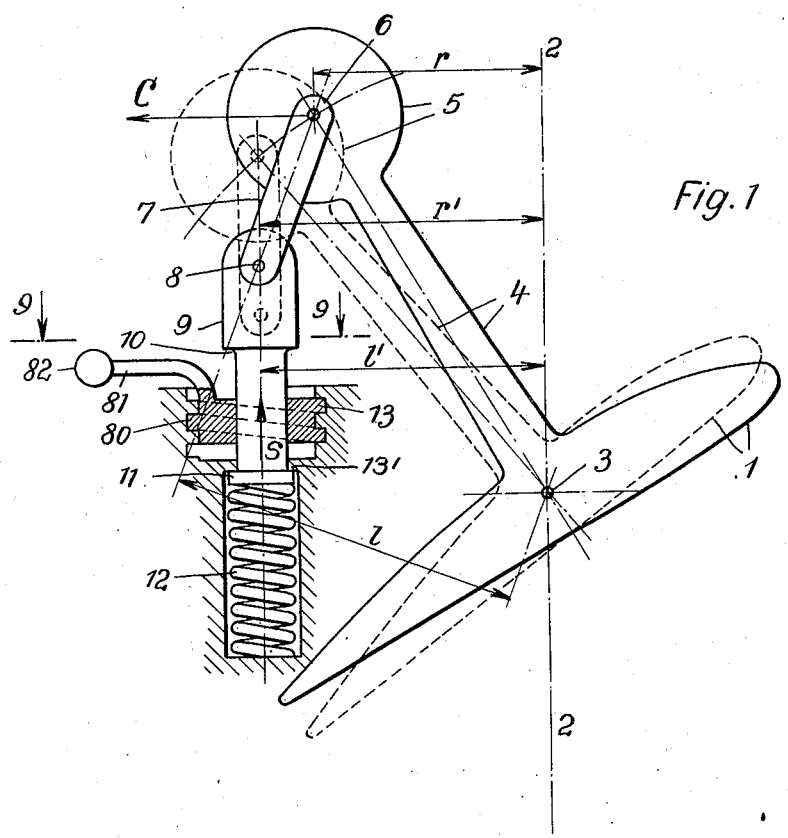
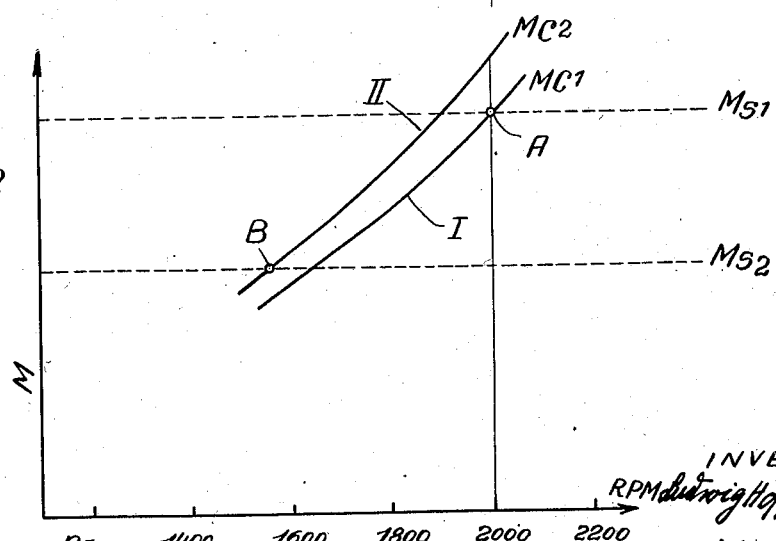
INVENTORS
Ludwig Hoffmann
Manfred Grabarse
By Franz Reinhold
ATTORNEY

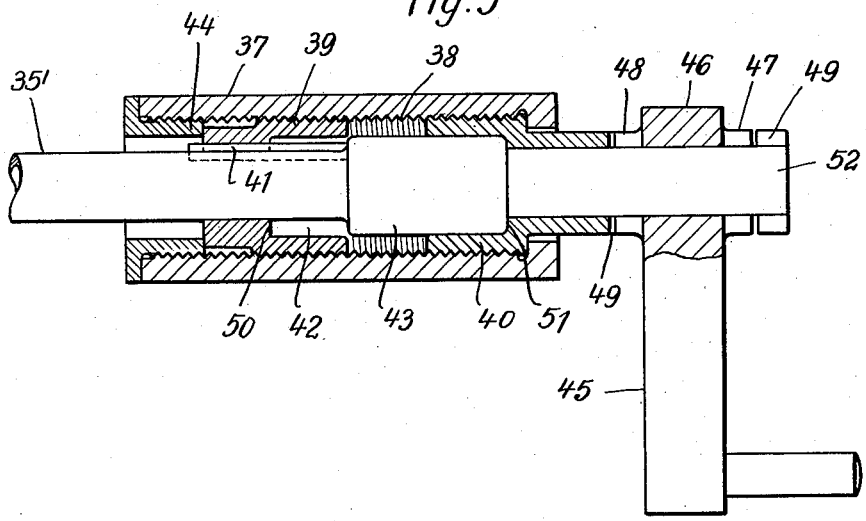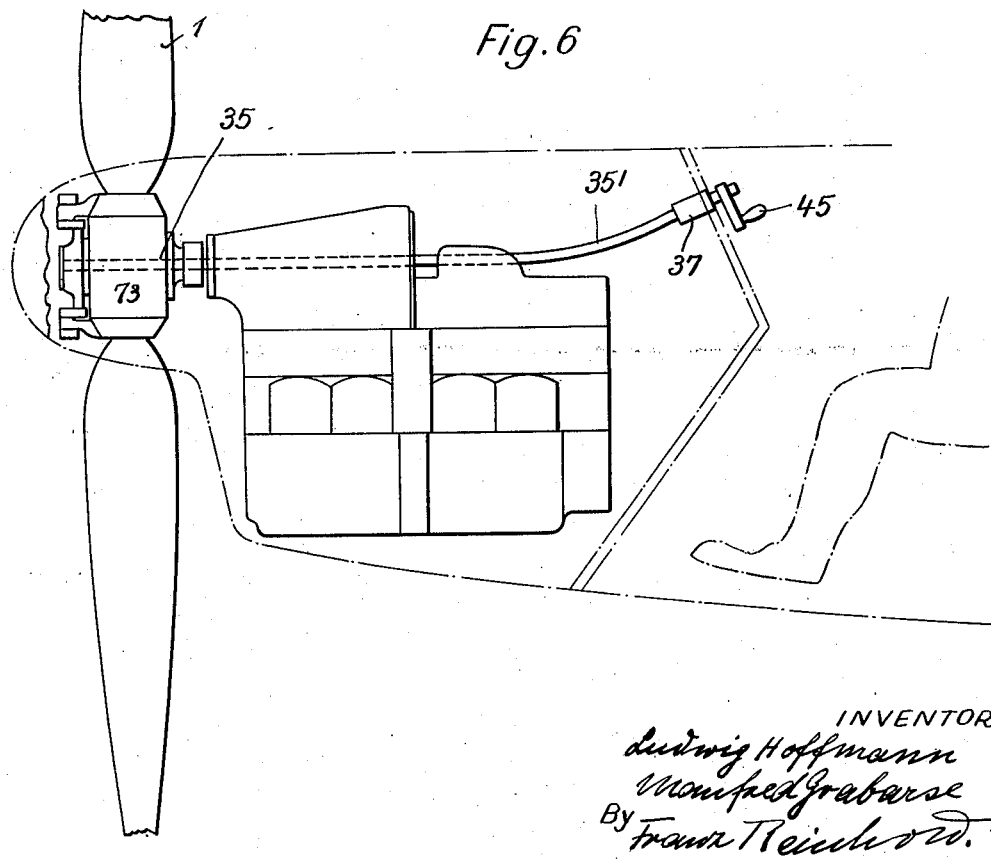

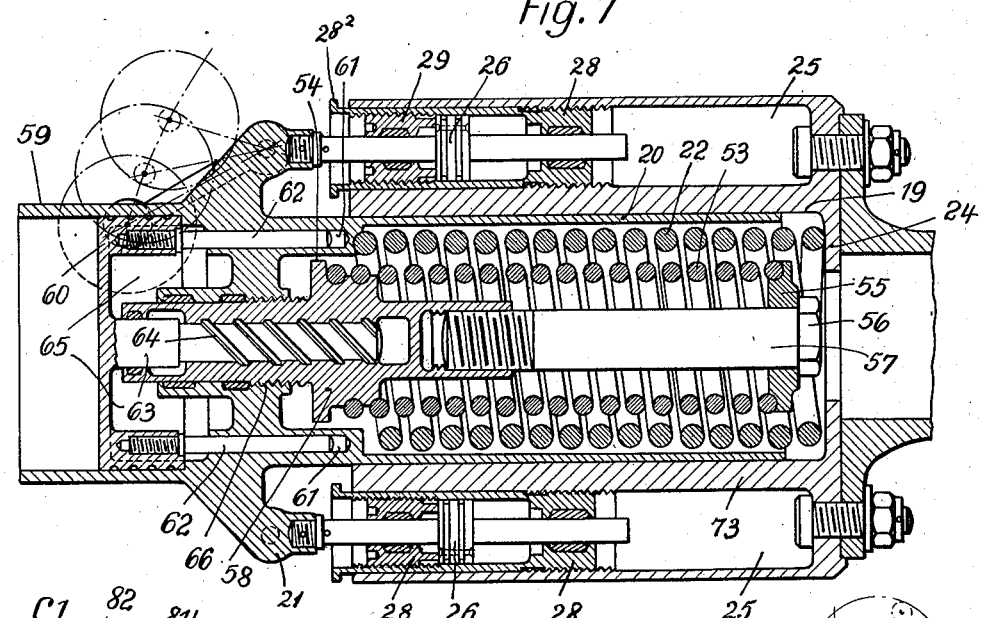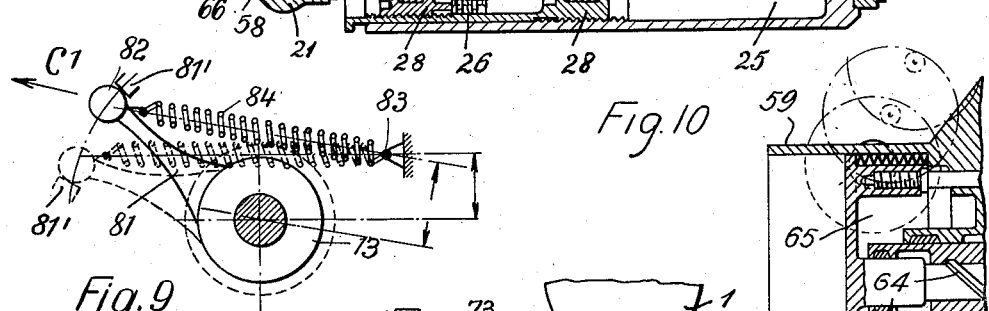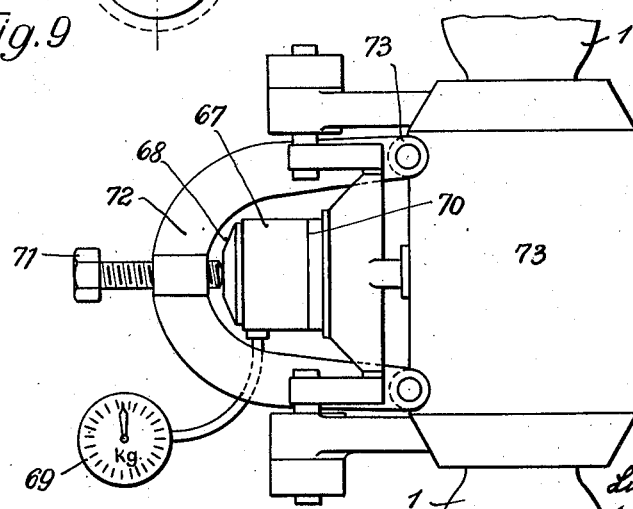

Patented Nov. 26, 1935

2,021,999

UNITED STATES PATENT OFFICE 2,021,999

AIR PROPELLER

Ludwig Hoffmann and Manfred Grabarse, Berlin-Hermsdorf, Germany, assignors to Gustav Schwarz G. m. b. H., Berlin-Waidmannslust, Germany, a limited company of Germany Application June 23, 1934, Serial No. 732,110
In Germany June 24, 1933

14 Claims. (Cl. 170—162)

Our invention relates to improvements in air propellers, and more particularly in air propellers of the type in which the blades are adapted to be automatically set about their axes in different positions in accordance with a variable condition of operation, such as the velocity of flight, the number of revolutions, the dynamic air pressure, or the static air pressure, the said propellers comprising a regulating system in which a setting power depending upon the said variable factor is in equilibrium with a variable resetting power. If for example, in such propellers the variable factor is the number of revolutions of the propeller, the resetting power is produced for example by a weighted body which is positively connected with the blades, eccentrically mounted and movable in the direction of the centrifugal force, while the resetting power is exerted for example by a spring, and the tension of the spring counteracting the centrifugal force is such that according to the number of revolutions the system is set in different positions of equilibrium.

The object of the improvements is to provide a propeller of this type in which the blades are not subject to disturbing forces adapted to move the same out of the correct positions to which they have been set. Such disturbing forces are produced in a high degree in the operation. Apart from friction the variable moment of the forces of the air on the blades acts as a disturbing force, further, elastic deformations of the blades, undesired variations of the tension of the springs or other resetting members, for example, by fatiguing, etc.

Another object of the improvements is to provide a propeller in which the blades are in a stable state of regulation, so that they are not made to oscillate about their axes by the setting and resetting devices continuously moving the same beyond the correct position and returning the same into an initial position.

With these and other objects in view our invention consists in constructing the regulator so that the blades are held in stable equilibrium in several positions. Thus, the setting of the blade from one of the said positions into an adjacent one is effected only when the variable factor of the operation, for example the number of revolutions, has passed upwardly or downwardly beyond a certain value, the said values being different from each other by a definite measure. Since the regulator is thus always in stable equilibrium independently of the position of the blades (except at the moments when setting takes place), the influence of the disturbing forces is obviated, because the stabilizing forces are chosen so that they largely exceed the disturbing forces.

The substitution of continuous regulation by step-wise regulation practically causes no disadvantages as might be assumed at first sight. For on the one hand the number of the steps may be enlarged when it is desired that the regulation approximates continuous regulation. On the other hand practical operation requires that the pitch of the propeller be not continuously varied in accordance with the number of revolutions, the velocity of flight or other conditions, because frequently it is desired for example to fly within a certain range of velocity with the highest pitch of the propeller, for example during a touring flight with throttled engine, in order to obtain comparatively high velocity with low motor effect. In practical operation substantially only two positions of the pitch of the propeller are needed, one for ascending flight, and the other one for velocity flight. Accordingly it is sufficient to construct the regulator for two positions of the blades. For special purposes particularly for a flight at great height a third step may be provided.

In describing the invention reference will be made to a regulating system depending on the number of revolutions of the propeller, a centrifugal body or bodies and a spring or springs counteracting the same being provided for setting the blades in position. But we wish it to be understood that our invention is not limited to regulation in dependence of velocity nor to the use of a centrifugal body and springs for setting the blades.

Figure 3:
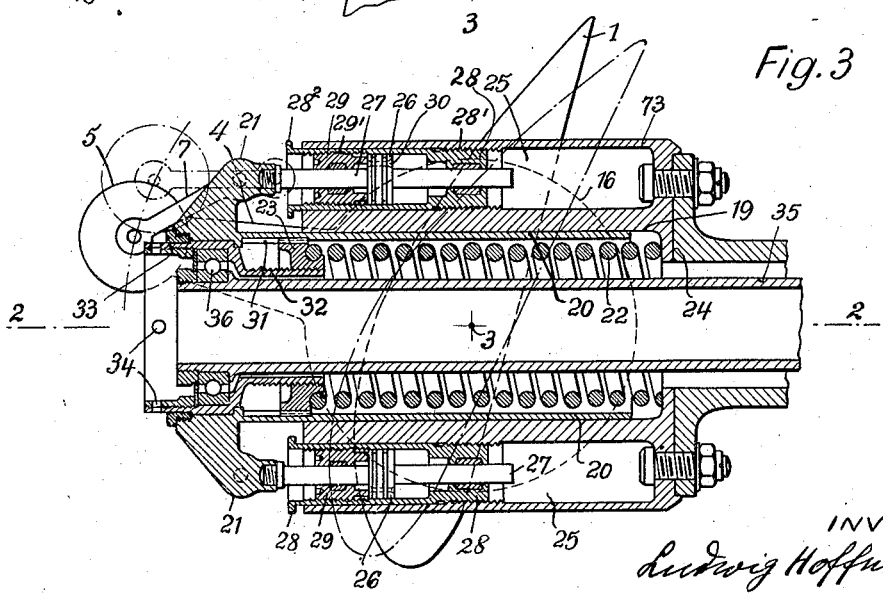

For the purpose of explaining the invention several examples embodying the same have been shown in the accompanying drawings in which the same reference characters have been used in all the views to indicate corresponding parts. In said drawings, Fig. 1 is an elevation partly in section showing the propeller in a somewhat diagrammatical way,

Fig. 2 a diagram,

Fig. 3 is a sectional elevation of the hub of a propeller, the figure showing a practical embodiment of the invention, Fig. 4 is an elevation partly in section of the hub shown in Fig. 3, Fig. 5 is a sectional elevation showing a hand operated device controlling the setting mechanism.

Fig. 6 is an elevation showing the propeller and the device controlling the setting mechanism as mounted on an air craft, Fig. 7 is a sectional elevation showing a modification of the apparatus shown in Fig. 3, Fig. 8 is an elevation showing a measuring device, Fig. 9 a detail sectional elevation taken on the line 9—9 of Fig. 1, and Fig. 10 is a fragmentary sectional elevation similar to the left hand part of Fig. 7 and showing a modification.

Fig. 1 shows diagrammatically one of the blades 1 of an air propeller. The axis of the propeller, ordinarily the shaft of the engine, is represented by a line 2—2. In the construction shown in Fig. 1 the blades are adapted to be set into two different positions. The blade 1 is adapted to be turned about its axis 3 indicated in Fig. 1 by a point, for varying the pitch. The position illustrated in full lines corresponds to a small pitch of the propeller, and the position shown in dotted lines corresponds to a larger pitch. To the blade an arm 4 is secured which carries at its end a weighted body 5 acted upon by the centrifugal force C indicated in the figure by an arrow. To a pin 6 provided at the outer end of the arm 4 a link 7 is jointed which is connected with its other end to a pin 8 carried by a rod 9 formed with a shoulder 10 and a collar 11, and acted upon by a coiled spring 12. In the position shown in the figure the collar 11 bears on a shoulder 13' of the body of the hub, while the collar 10 is spaced from a nut 13 which for the present may be assumed to be fixed in position.

The operation of the system is as follows:

While the propeller is at rest the centrifugal force C is zero, and the force exerted by the spring 12, sets the blades into the position of small pitch shown in full lines, the collar 11 bearing on the shoulder 13' of the hub. When the propeller rotates the force C acts on the weighted body 5, which force acts in opposition to the force S of the spring. When the force C has attained a value which exceeds the power of the spring the weighted body 5 and thereby the blade 1 are turned about the axis 3 into the position of high pitch shown in dotted lines and so far that the shoulder 10 of the rod 9 bears on the nut 13. Thereby the power of the spring is increased by compression, which, however, has no influence on the setting operation, because simultaneously the length of the lever through which the force of the spring acts on the blade is reduced in a higher degree, because in the original position the spring acts on the blade through a length of lever $l$, and in the second position only through a lever of the length $l'$, the angular position of the link 7 relatively to the axis 2, 2 being varied by the movement of the arm 4. Further, while the weighted body 5 is being displaced the centrifugal force 7 rises by reason of the increase of the radius $r$ to $r'$.

The conditions are illustrated in detail in the diagram shown in Fig. 2, in which the moments $Ms$ exerted by the force S of the spring and the moments $Mc$ exerted by the centrifugal force C have been plotted as ordinates from the line of abscissae representing the number of revolutions $n$.

At first the blades of the propeller may be in the position of small pitch. As the number of revolutions $n$ is increased the centrifugal force rises according to the curve I. The moment produced in this position of the blade by the spring has the value $Ms$ which is independent of the number of revolution. If the moments of the spring and the centrifugal force become equal as is indicated by the point A the blade is turned about its axis 3 into the position shown in Fig. 1 in dotted lines. By the reduction of the length of the lever of the spring from $l$ to $l'$ the moment of the spring is reduced to the value $Ms2$, while simultaneously the centrifugal force rises by the radius being increased from $r$ to $r'$ (Figure 1), so that now the centrifugal moment follows the curve II. If the number of revolutions rises above the value corresponding to the point A, the blade remains in the position of large pitch. This is also the case when the number of revolutions is reduced. Resetting does not take place already when a value of the number of revolutions is attained which corresponds to the point A, but only when the centrifugal moment $Mc2$ has fallen off to the value of the reduced moment $Ms2$ of the spring. In Fig. 2 the point B corresponds to the returning of the blade into the position of low pitch.

If now the number of revolutions rises again along the curve I setting takes place when the forces have the value represented by the point A as has been described.

In both positions the blade is always in stable equilibrium, and forces of definite size are needed for bringing the same out of its position. This is one of the essential differences between the air propeller of this invention and automatically set air propellers of known constructions, which have continuous regulation, and in which therefore the blade is always in indifferent equilibrium in which infinitely small forces are sufficient for throwing the same out of its position.

The characteristic change of the setting operations in dependence of the number of revolutions, which appears from Fig. 2, corresponds to the practical requirements in a full degree and in a higher degree than the known continuous regulation, as appears from the following:

During take off and climbing the number of revolutions of the propeller is comparatively small and it is below the value corresponding to the point A. Therefore the propeller is in the position of small pitch which corresponds to the requirements of climbing. If after having attained the desired height the air craft is set for flying level, the number of revolutions rises beyond the point A by reason of the reduction of the resistance. When the number of revolutions has passed beyond the point A the blade is set into the position of small pitch, which corresponds to the requirements of flying at high velocity. When beginning the touring flight the pilot may throttle the engine, so that the number of revolutions slightly falls off without the position of the blade corresponding to the velocity flight being changed, because setting would take place only at the point B, and therefore the range of the numbers of revolutions included between the points A and B is at the disposal of the pilot for throttling.

Only if the number of revolutions falls below the value corresponding to the point B, for example when the pilot prepares for landing and almost completely throttles the engine, the blades are set into the initial position of small pitch, and therefore into the position needed for a new start or for an ascending flight which may be necessary by reason of the landing operation having failed.

In the practical embodiment shown in Figs. 3 and 4 the blades 1, which are rockable about the axis 3, 3 in opposite senses, are mounted in sleeves 14 made in two sections, which sleeves are mounted for being turned about their axis in antifriction bearings 15 of the body of the hub 90. Each of the sleeves 14 has a ring 16 fixed thereto, which is connected or made integral with laterally projecting arms 4 the outer ends of which carry the weighted bodies 5 and have the links 7 jointed thereto. The said bodies are located in Fig. 4, respectively above and below the plane in which the axes 2—2 and 3—3 are located, as will be understood from Fig. 3. Frequently a separate weighted body may be dispensed with, because the eccentric mass of the arm 4 produces a sufficient centrifugal moment. On the arm 4 or on the weighted body 5 additional weighted bodies 18 may be provided for imparting another characteristic curve to the regulator. In an axial bore 19 made in the body 73 of the hub a sleeve 20 is longitudinally shiftable which is made integral with two eyes 21 disposed at opposite sides of the sleeve, and to the said eyes the links 7 are jointed one for each of the blades. Within the sleeve 20 there is a coiled spring 22 which bears with one end on a ring 23 and with its other end on an inwardly directed flange 24 provided within the hub 90 at the end of the bore 19. The said spring tends to shift the sleeve 20 towards the left in Fig. 3. In principle, it corresponds to the spring 12 shown in Fig. 1 in so far, as it tends to move the blades 1 into the position shown in full lines in which the pitch is small. If the centrifugal force exceeds a definite value, the weighted bodies 5 are displaced outwardly and they set the blades in opposition to the power of the spring 22 into the position of large pitch. In Fig. 3 the positions of one of the weighted bodies have been indicated respectively in full lines and in dashes and dots.

In bores 25 located laterally and at opposite sides of the bore 19 pistons 26 are shiftable which are rigidly connected by rods 27 with the eyes 21 of the sleeve 20. The movement of the pistons is limited by bushings 28, 29 fitted within the bores 25. The chambers provided between the said bushings and the pistons 26 may be filled with oil, and the pistons 26 are provided each with a longitudinal bore 30 through which the oil is pressed when the pistons are being set, the apparatus being used for damping or braking the movement of the pistons 26 and the blade setting mechanism connected therewith. In the construction shown in Fig. 3 the bushing 29 is located within a tubular extension of the bushing 28², and both bushings are formed with external screw-threads 28' and 29' by means of which they are adjustable longitudinally of the bore 25 for varying the stroke of the piston and therefore the angle at which the blades are set. By mounting the bushing 29 within the bushing 28 both bushings may be moved simultaneously and in the same direction by turning the bushing 28, so that the distance between the opposing faces of the bushings remains constant, and both bushings may be turned so that the distance between the said faces is altered. As the positions of the said opposing faces of the bushings control the pitch of the blades, the said pitch to which the blades are set in the end positions may be varied. The ring 23 may be rigidly connected with the sleeve 20. However, in the construction shown in Fig. 3 it is shiftable longitudinally of the sleeve 20, so that the tension of the spring 22 may be varied. For this purpose it is mounted on a sleeve 33, and the sleeve 33 and the ring 23 are provided with interengaging screw-threads 32. The sleeve 33 is rotatable but not shiftable within the sleeve 20, and rotary movement of the ring 23 is prevented by a key and groove 31. The sleeve 33 may be turned by hand by means of a key engaging in holes 34. Thus the ring 23 may be shifted in axial direction for varying the tension of the spring 22.

Within the sleeve 20 there is a tubular rod 35 which is connected with the said sleeve through the intermediary of an antifriction bearing 36, so that it is movable with the said sleeve in axial direction without, however, taking part in the rotary movement of the axis 2, 2 of the propeller. The rod 35 is connected in a suitable way with a device which as is shown in Fig. 6 is mounted near the seat of the pilot, and which is used for regulating the stroke of the sleeve 20 and the setting of the blades by hand. This device may be constructed in the manner shown in Fig. 5. As shown, the rod 35, or a flexible shaft 35' positively connected therewith, is passed through a sleeve 37 which is provided internally with screw-threads 38 engaged by a pair of bushings 39 and 40, and which is fixed to a suitable part near the seat of the pilot. The bushing 39 is connected with the shaft 35' by means of groove and key 41 so that it takes part in the rotary movement of the shaft but is shiftable relatively thereto. At its inner end the bore of the bushing is enlarged at 42 so that a collar 43 provided on the shaft 35' may pass into the same. The axial movement of the bushing 39 turning in the screw-threads of the sleeve 38 is limited by a bushing 44 and by the end face of the bushing 40. On the free end of the shaft 35' a crank is loosely mounted which is equipped at either side of its hub 46 with claws 47 and 48 adapted for engagement with corresponding claws 49 provided respectively at the end of the shaft 35' and at the end of the bushing 40 projecting from the sleeve 37. The bore of the bushing 40 is enlarged at its inner end and the enlarged portion is adapted to be engaged by the collar 43. The shoulders 50 and 51 within the bushings 39 and 40 provide stops for the axial movement of the shaft 35', and they determine the positions of the blades by reason of the positive connection of the said shaft with the sleeve 20. By means of the crank 45 the bushings 39 and 40 may be displaced at will. When the crank 45 is turned while it is in the position shown in the figure in which the claws 48 and 49 are in engagement with each other, the bushing 40 is screwed into or out of the sleeve 37, and when the crank 45 is shifted towards the end 52 of the shaft 35' and with the claws 47 and 49 into engagement with each other, rotary movement of the crank, the shaft 35' and the bushing 40 causes axial displacement of the bushing 39. The shoulders 50 and 51 of the bushings 39 and 40 provide the end stops for the displacement of the sleeve 20, and therefore they control the setting of the blades.

By means of the apparatus shown in Fig. 5 not only the limits of pitch of the blades may be varied at will, but in addition automatic displacement may be completely prevented, by screwing the bushings 39 and 40 towards each other, so that both of them bear on the collar 43. The bushings may thus be fixed in any position, and therefore any desired pitch may be imparted by hand to the blades.

While by means of the apparatus shown in Fig. 5 the pitches to which the blades are set in the end positions may be varied at will, by varying the tension of the spring by means of the ring 23 the number of revolutions at which setting takes place may be varied at will.

The construction may be such that the blades are adapted to assume not only two, but three or more positions in which they are in stable equilibrium. This result is obtained for example by providing a subsidiary spring or springs which are made effective when the blades being set are in intermediate positions, and which increase the spring power counteracting the centrifugal force of the weighted bodies 18 by a definite value. In the construction shown in Fig. 7 concentrically of the spring 22 a second coiled spring 53 is provided which bears with one end on a flange 54 formed on a sleeve 58 and with the other end on a disk 55. For the present the sleeve 58 and the flange 54 may be assumed to be rigidly connected with the sleeve 20. The disk 55 is shiftable on a rod 57 formed with a head 56 providing an end stop and rigidly connected with the sleeve 58. The flange 24 on which the spring 22 is supported is extended inwardly so far that it provides a stop for the disk 55.

The propeller may be in the position of small pitch. If the number of revolutions is increased so far that the centrifugal force compensates the power of the spring 22 the sleeve 20 is shifted in the manner described above within the bore 19 while compressing the spring 22. However before the end of the stroke of the sleeve 20, the disk 55 engages the flange 24, so that the power of the spring counteracting the centrifugal force is materially increased by the spring 53 being added to the spring 22. Only after the centrifugal force has further risen to a definite value in which it is able to overcome the forces of both springs, further setting to the end stop takes place. Fig. 7 shows the three different positions of the weighted body 5.

Also in the intermediate position in which the spring 53 counteracts the centrifugal force only by reason of its initial tension together with that of the spring 22, the propeller is in stable equilibrium, because an increase of the centrifugal force causes setting only after exceeding a definite limit, and vice-versa a reduction of the centrifugal force below the value where setting into the intermediate position takes place would cause resetting into the initial position only when the reduction of the length of the lever connected with the setting operation is compensated.

The action of the spring 53 may be regulated at will by varying the tension thereof. Such regulation may also be automatically made, for example in dependence of the air pressure.

For this purpose in Fig. 7 a piston 60 is shiftable coaxially of the sleeve 20 in a hollow cylindrical extension 59, which piston is locked against rotary movement by a rod 62 connected therewith and extending in a bore 61 of the sleeve 20. To the said piston a spindle 63 having screw-threads 64 of large pitch is secured. The piston encloses a chamber 65 which is closed from all sides in an air-tight way and which is filled with air under atmospheric pressure. When the aircraft rises to greater heights the outer atmospheric pressure falls off, so that the piston 60 is forced outwardly by the air confined within the chamber 65. Therefore the piston always assumes a position corresponding to the outer air pressure.

The spindle 63 is in engagement with the sleeve 58 which heretofore was assumed to be rigidly connected with the sleeve 20, which, however, really is adapted to be turned relatively thereto in screw-threads 66. When the sleeve 58 is turned the spring 53, its stop 55 and the bolt 57 are turned and axially shifted according to the pitch of the screw-threads 66. Thereby the distance between the stop 55 and the flange 24 is varied.

If the piston 69 is shifted in the manner described according to the outer air pressure the spindle 63 which is formed with screw-threads of large pitch causes rotary movement of the sleeve 58 and a variation of the distance between the parts 24 and 55. The senses of the pitches of the screw-threads 64 and 66 are such that upon a reduction of the pressure of the outer air and accordingly outward movement of the piston 60, the distance between the stops 55 and 24 is reduced. However, the smaller the said distance is, the lower is the number of revolutions at which the blade is set into the position of highest pitch. This corresponds to the practical requirements of the flight at great height.

The shiftable piston 60 may be replaced with a diaphragm as has been indicated in Fig. 10, where the diaphragm has received the reference character 91. In the construction shown in Fig. 7 two springs are provided which are successively thrown into operation. Thus the blade has three positions of stable equilibrium. But we wish it to be understood that our invention is not limited to the use of three springs only.

The total range of regulation may be subdivided into several steps also in another way, as is shown diagrammatically in Figs. 1 and 9. As has been remarked above, the ring 13 acts as a stop for the shoulder 10 when the centrifugal force shifts the rod 9 downwardly while compressing the spring. Heretofore the nut 13 has been assumed to be fixed in position. As a matter of fact it is axially shiftable, and it is provided externally with screw-threads 80 of large pitch. On an arm 81 rigidly connected therewith a weighted body 82 is mounted which is subjected to centrifugal force. In Fig. 9 the centrifugal force acting thereon has been indicated C'. A spring 84 attached to a relatively fixed point 83 and to the lever 81 tends to turn the nut 13 in Fig. 9 in clockwise direction. If the centrifugal force C' rises to a value exceeding the spring power, the weighted body 82 gets into the position shown in Fig. 9 in dotted lines. Thereby the spring is somewhat put under tension, and simultaneously the length of the lever through which the spring acts is considerably reduced. Therefore the weighted body 82 and the nut 13 remain in the new position until the centrifugal force has attained a value which is so small that the moment exerted thereby is not sufficient any more to overcome the power of the spring. Now the nut 13 returns into the initial position shown in full lines with a number of revolutions of the propeller which is below the number of revolutions at which the first setting operation took place. The movement of the arm 81 in either direction is limited by stops 81' shown diagrammatically in Fig. 9.

With the rotary movement of the ring 13 an axial displacement is connected, so that the stop for the shoulder 10 changes its position. The parts have such dimensions and arrangement that upon an increase of the number of revolutions setting of the weighted body 82 takes place only after the weighted body 5 with the link 7 and the rod 9 have been set, and when the shoulder 10 bears on the nut 13. When the nut 13 is set the stop for the shoulder 10 gets into a lower position, and the centrifugal force acting at the point 6 moves the blade into a third position in which the pitch is still larger than in the position shown in Fig. 1 in dotted lines.

For exactly testing the spring power in a simple way the apparatus illustrated in Fig. 8 is used. It consists of an oil-filled drum 67 with diaphragm 68 and a manometer 69, which drum is placed on the front side 70 of the sleeve 20. At the opposite side a ball 72 provided with a pressure screw 71 is fixed in a suitable way, for example to the eyes 73 of the body of the hub. By screwing the screw 71 down the size of the tension of the spring may be read from the manometer 69.

While in describing the invention reference has been made to particular examples embodying the same we wish it to be understood that our invention is not limited to the constructions shown in the accompanying drawings and that various changes may be made in the general arrangement of the apparatus and the construction of its parts without departing from the invention. For example in the construction shown in Fig. 1 the moment of the centrifugal or setting force C is increased and the moment of the resetting force exerted by the spring 12 is reduced when the weighted body moves from the position shown in full lines into the position shown in dotted lines. We wish it to be understood that our invention is not limited to this specific construction, the essential feature being that under the said conditions the moment of the resetting force is reduced relatively to the moment of the setting force.

We claim:

1. An air propeller, comprising a hub, a blade mounted thereon and adapted to be turned about its axis, and mechanism operatively connected with said blade for turning the same about its axis and comprising a device controlled by a variable factor of the operation for exerting a setting force and a device for exerting a resetting force thereon, said mechanism being constructed so as to have its parts changed in position by the action of said devices in such a way that the effect of the resetting force relatively to that of the setting force is changed in a sense opposite to the change of the setting force.

2. An air propeller, comprising a hub, a blade mounted thereon and adapted to be turned about its axis, mechanism operatively connected with said blade for turning the same about its axis and comprising a device controlled by a variable factor of the operation for exerting a setting force and a device for exerting a resetting force thereon, said devices being connected with each other by a link in position for having its angular position changed by the relative movements of said devices in a sense for varying the effect of the forces of the setting and resetting devices relatively to each other.

3. An air propeller, comprising a hub, a blade mounted thereon and adapted to be turned about its axis, mechanism operatively connected with said blade for turning the same about its axis and comprising a device controlled by a variable and comprising a factor of the operation for exerting a setting force and a device for exerting a resetting force thereon, said devices acting respectively on a member having rectilinear movement and on a member pivotally mounted and connected with each other by a link located so that the distance between the said link or its extension and the pivot varies according to the relative position of said devices, and stops limiting the relative movement of said devices.

4. An air propeller, comprising a hub, blades mounted thereon and adapted to be turned about their axes, mechanism operatively connected with said blades for turning the same about their axes and comprising devices for exerting setting and resetting forces thereon, one of said devices comprising a shiftable member and a spring having initial power and acting on said member and the other one comprising a member connected with said blades and movable towards and away from the direction of the movement of the first named member, a link connecting said members and stops limiting the end positions of said mechanism.

5. An air propeller as claimed in claim 1, in which the device for exerting resetting force comprises power exerting members which are successively made operative.

6. An air propeller as claimed in claim 1, comprising in addition a rod connected with said blade and formed with shoulders, stops cooperating with said shoulders for limiting axial movement of said rod, and means for shifting said stops towards and away from said shoulders.

7. An air propeller, as claimed in claim 1, in which the device exerting resetting force comprises power exerting members which are successively made operative, and in which automatic means controlled by a variable factor are provided for varying the conditions under which the said members are made operative.

8. An air propeller as claimed in claim 1, comprising in addition stops for limiting the movement of said mechanism, and automatic means controlled by a factor of service for shifting one of said stops.

9. An air propeller as claimed in claim 1, comprising in addition means for braking said mechanism.

10. An air propeller as claimed in claim 1, comprising in addition means for measuring said resetting force.

11. An air propeller comprising a hub, a blade mounted thereon and adapted to be turned about its axis, and automatic mechanism adapted to be operated by a variable factor of service for turning said blade about its axis and having several positions of stable equilibrium, the said mechanism being constructed so that the forces acting thereon are adapted immediately to shift the blade when removed out of one position of stable equilibrium, into the other one.

12. An air propeller as claimed in claim 11, comprising in addition stops for limiting the pitch of the blade in either direction, and means for simultaneously varying the positions of both stops in the direction of the movement of the said mechanism and in the same sense.

13. An air propeller as claimed in claim 11, comprising in addition stops for limiting the pitch of the said blade in either direction, and means for varying the positions of both stops independently of each other and in the direction of the movement of said mechanism.

14. An air propeller as claimed in claim 11, comprising in addition stops for limiting the pitch of the blade in either direction, and means for varying the positions of both stops independently of each other and in either sense in the direction of the movement of said mechanism.

LUDWIG HOFFMANN.
MANFRED GRABARSE.